Oct. 14, 1969                J. WASHBOURN                3,472,562
FLUID PRESSURE BRAKE CONTROL VALVE
Filed Jan. 3, 1968                                2 Sheets-Sheet 1

INVENTOR
JACK WASHBOURN
BY *Ralph W. McIntire*
ATTORNEY

United States Patent Office 3,472,562
Patented Oct. 14, 1969

3,472,562
FLUID PRESSURE BRAKE CONTROL VALVE
Jack Washbourn, Malmesbury, England, assignor, by mesne assignments, to Westinghouse Air Brake Company, Pittsburgh, Pa.
Filed Jan. 3, 1968, Ser. No. 695,400
Int. Cl. B60t 11/34, 17/06
U.S. Cl. 303—66                           4 Claims

ABSTRACT OF THE DISCLOSURE

A control valve device, otherwise known as a triple valve device of the direct release type, in which a predetermined brake releasing increase in brake pipe control pressure relative to auxiliary reservoir pressure, after a brake applying brake pipe reduction relative to pressure in an auxiliary reservoir charged by the brake pipe has operated valve means to charge a brake cylinder to auxiliary reservoir pressure, vents the brake cylinder and also operates a valve device which applies pressure to the brake pipe from an additional reservoir previously charged by the auxiliary reservoir in a unidirectional manner, thereby providing an increase in brake pipe pressure at an accelerated rate for rapid propagation of a brake release signal through the brake pipe to other control valves in a train.

BACKGROUND OF INVENTION

With direct release triple valves it is of considerable advantage if all of them in a train can be made to release, as nearly as possible, at the same time. Normally, a triple valve release when the brake pipe pressure builds up above the auxiliary reservoir pressure by a predetermined amount, say 1½ to 2 p.s.i. In a long train, especially at the trailing end, it takes some time for the brake pipe pressure to build up by this amount, and so the rear of the train starts to release some time after the front. This results in shock loadings between the vehicles of the train.

In the invention as described in British Patent No. 788,495 this defect is overcome by introducing a valve which connects the brake pipe to a previously charged reservoir when the brake pipe pressure is increased above that in the auxiliary reservoir by about 2 p.s.i.

This prior arrangement requires, however, an extra valve and the object of the present invention is to achieve the same results by a simple modification of an existing valve.

SUMMARY OF THE INVENTION

Reference is made to copending application 695,401, filed by Jack Washbourn on Jan. 3, 1968, for a description of the structure and operation of the basic control valve device disclosed in this application.

The invention consists of a direct release triple valve of the type having a separate valve assembly for retarding the recharge of the auxiliary reservoir when the brake pipe pressure exceeds the auxiliary reservoir pressure by a predetermined amount, characterized by the inclusion of valve means and such that upon the valve assembly moving to the position where the charging is retarded, a connection is made between a previously charged reservoir and the brake pipe.

The connection between the brake pipe and the reservoir contains a check valve allowing flow from the reservoir to the brake pipe but preventing flow from the brake pipe to the reservoir.

The reservoir is charged from the auxiliary reservoir via a check valve.

Figure 1:
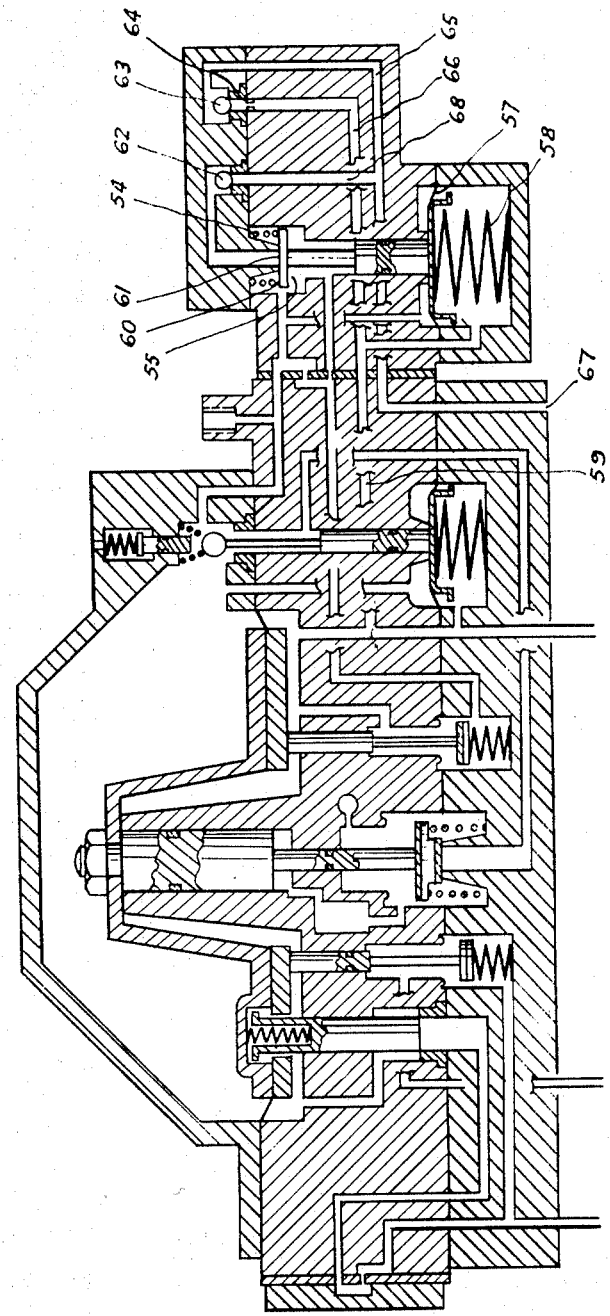
Figure 2:
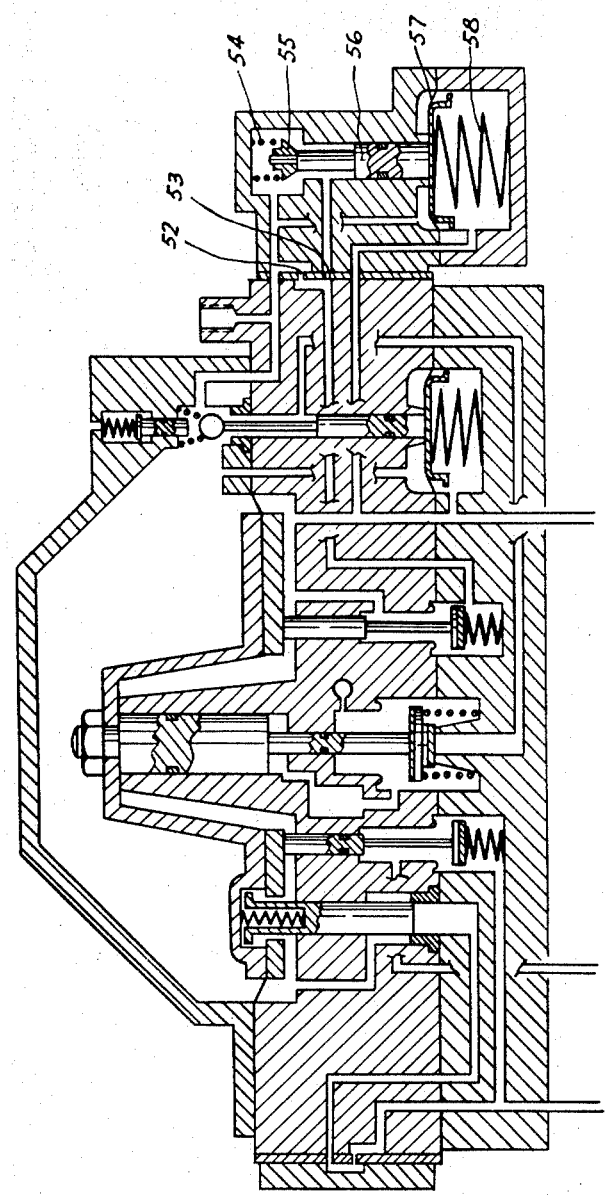

An example of the invention is shown sectionally and diagrammatically in FIG. 1 and the existing type of triple valve to which this invention is applicable is similarly shown in FIG. 2.

Referring first to FIG. 2, the existing triple valve includes a diaphragm 57, subject on its upper side to brake pipe pressure, on its lower side to auxiliary reservoir pressure and to the loading effect of a spring 58.

The diaphragm acts on stem 56 which carries a closure valve 55, loaded by a spring 54.

In charging, if the brake pipe pressure exceeds that in the auxiliary reservoir by a predetermined amount (about 3 p.s.i.), spring 58 is overcome and diaphragm 57 moves down, allowing spring 54 to close valve 55. Before this occurred, charging could take place via both chokes 52 and 53, but after valve 55 closes charging can only take place via choke 52.

This arrangement is well known and its purpose is to throttle charging at the front of the train so as to make more air available to charge the rear.

FIG. 1 shows the prior arrangement modified according to this invention. The valve 55 is now provided with a second seating face 60, which with brake pipe and auxiliary reservoir pressures equal is held against a seat 61 in the top cover, by the loading of spring 58, this spring overcoming the force of spring 54.

An extra reservoir (not shown) is connected to the passage sealed by the seat 61 via passage 68 and check valve 62.

The extra reservoir is charged from the auxiliary reservoir via passage 59, passage 66, choke 64 and check valve 63 and hence by passage 65 and connection 67.

OPERATION OF THE INVENTION

In operation the valve 55, 60 is in the position shown in FIG. 1 with the system charged and when the triple valve is applied.

When the brake pipe is recharged to release the brake, as soon as the brake pipe pressure exceeds that in the auxiliary reservoir by about 2 to 3 p.s.i. the brake pipe pressure acting on diaphragm 57, overcomes spring 58 and the diaphragm moves down permitting spring 54, to open valve 60 and thus connect the charged extra reservoir to the brake pipe via open valve 60, check valve 62, passage 68 and connection 67. The pressure in the brake pipe is, therefore, suddenly increased and this increase is effective on the vehicles down the train causing the triple valves on these vehicles to move to release. Thus a rapid release is obtained along the length of the train. The more triples fitted with this feature the greater the improvement in release propagation.

When valve 60 moves down it will cause valve 55 to close and restrict the auxiliary reservoir charging as previously described.

Having now described the invention, what I claim as new and desire to secure by Letters Patent is:

1. A control valve device for applying and releasing air brakes in response to control pressure in a brake pipe, comprising:
    (a) first means responsive to predominance in brake pipe pressure in one chamber relative to auxiliary reservoir pressure in another chamber to exhaust a brake cylinder and provide a communication to charge an auxiliary reservoir with brake pipe pressure, and operable in response to predomination of said pressure in said another chamber relative to said pressure in said one chamber to charge said brake cylinder to auxiliary reservoir pressure and sever said communication;
    (b) second means for unidirectionally communicating said auxiliary reservoir to charge an additional reservoir;
    (c) third means including valve means operable when open to communicate said additional reservoir to said brake pipe;

(d) said valve means being normally closed and operable to open in response to a predetermined predominance of brake pipe pressure relative to auxiliary reservoir pressure.

2. A control valve device for applying and releasing air brakes in response to control pressure in a brake pipe, as recited in claim 1, in which:

(a) said valve means when closed relative to said third means opens a fourth means for communicating said auxiliary reservoir with said brake pipe;

(b) fifth means for communicating said auxiliary reservoir to said brake pipe in by-pass of said valve means;

(c) said valve means when open relative to said third means is closed relative to said fourth means.

3. A control valve device for applying and releasing air brakes in response to control pressure in a brake pipe, as recited in claim 1, in which:

(a) said valve means is operated by means including a piston; and (b) said piston being subject on one side to brake pipe pressure and subject on the other side to spring biasing means and auxiliary reservoir pressure.

4. A control valve device for applying and releasing air brakes in response to control pressure in a brake pipe, as recited in claim 2, in which:

(a) said valve means is operated by means including a piston; and (b) said piston being subject on one side to brake pipe pressure, and subject on the other side to spring biasing means and auxiliary reservoir pressure, a predominance of pressure on said one side relative to that on said other side operating said valve means to open relative to said third means and close relative to said fourth means.

References Cited

UNITED STATES PATENTS

| 1,801,819 | 4/1931 | Nelson | 303—85 |
| 1,952,345 | 3/1934 | Westinghouse | 303—66 |
| 2,273,952 | 2/1942 | Gorman | 303—85 X |
| 2,846,273 | 8/1958 | Sexton et al. | 303—66 |

DUANE A. REGER, Primary Examiner

U.S. Cl. X.R.

303—33